United States Patent
Igarashi

(10) Patent No.: US 6,874,531 B2
(45) Date of Patent: Apr. 5, 2005

(54) RELIEF VALVE

(75) Inventor: Hiroki Igarashi, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 76 days.

(21) Appl. No.: 10/308,236

(22) Filed: Dec. 3, 2002

(65) Prior Publication Data

US 2003/0102031 A1 Jun. 5, 2003

(30) Foreign Application Priority Data

Dec. 3, 2001 (JP) ........................................ 2001-368517

(51) Int. Cl.[7] ............................................. F16K 15/02
(52) U.S. Cl. ...................... 137/536; 137/540; 251/335.3
(58) Field of Search ............................. 137/536 I, 540; 251/335.3

(56) References Cited

U.S. PATENT DOCUMENTS 2,040,776 A * 5/1936 Marvin ........................ 137/536
2,264,656 A * 12/1941 Briscoe et al. ............... 137/536
3,438,391 A * 4/1969 Yocum .................... 137/516.29
3,744,751 A * 7/1973 Robinson ...................... 137/540

* cited by examiner

Primary Examiner—Stephen M. Hepperle
(74) Attorney, Agent, or Firm—Browdy and Neimark, P.L.L.C.

(57) ABSTRACT

In a conventional relief valve having a valve element supported by a diaphragm, since a surface of the valve element exposed to pressure is large and an opening/closing operation of the valve element is rapidly conducted, the operation often leads to chattering and is therefore poor in stability. A relief valve of the invention is free from chattering and capable of smoothly performing the opening/closing operation of its valve element (7). The element (7) is adapted to open and close a fluid passage and disposed between: an inlet port (2) in direct communication with an upstream-side fluid passage (1); and, an outlet port (4) in direct communication with a downstream-side fluid passage (3), and is provided with a flange (8) in its upper portion. Mounted on the flange (8) is a sleeve-like bellows (6) for supporting the valve element (7).

10 Claims, 2 Drawing Sheets

RELIEF VALVE

BACKGROUND OF THE INVENTION

1. Field of the Invention

The present invention relates to a pressure relief valve, and more particularly to a pressure relief valve fitted to a fluid distribution system to control fluid in pressure in the system.

2. Description of the Related Art

In general, as shown in FIG. 2, a pressure relief valve of a conventional type comprises; an inlet port 32 in direct communication with an upstream-side flow passage 31; and, an outlet port 34 in direct communication with a downstream-side flow passage 33. In the conventional relief valve having the above construction, a relief fluid passage 35 intermediate the inlet port 32 and the outlet port 34 is opened and closed by a valve element 37, which has its peripheral portion supported by a resilient diaphragm 36.

As is clear from FIG. 2, the valve element 37 is always pushed downward by the spring 38 so that the relief fluid passage 35 normally stays closed. However, when a fluid pressure in the inlet port 32 reaches a predetermined set point of fluid pressure, the valve element 7 is pushed upward against a resilient force exerted by the spring 38 so that the relief fluid passage 35 is opened to permit fluid to flow through the inlet port 32, relief fluid passage 35, outlet port 34 and then the downstream-side flow passage 33. When a fluid pressure in the inlet port 32 becomes under the set point of the fluid pressure, the spring 38 forces the valve element 37 to move downward so that the relief fluid passage 35 is closed again and stays closed under the influence of the resilient force exerted by the spring 38.

The conventional relief valve having the above construction has a large surface of its valve element 37 exposed to the fluid pressure, the opening/closing operation of the valve element 37 directly depends on variations of the fluid pressure. Due to this, the conventional relief valve tends to incur the chattering problem. In other words, when chattering occurs, the entire area of the diaphragm 36 covering the relief fluid passage 35 extending from the inlet port 32 to the outlet port 34 is exposed to the variation of fluid pressure to rapidly open and close the valve element 37.

Further, in the conventional relief valve, the diaphragm 36 for supporting the valve element 37 keeps its form unchanged until the fluid pressure in the inlet port 32 reaches the set point. When once the fluid pressure in the inlet port 32 reaches the set point, the diaphragm 36 rapidly deforms to open the valve element 37. Consequently, this incurs the chattering problem of the valve element 37 of the conventional relief valve. Further, when chattering occurs, a large force is applied to the valve element 37 to often deform the diaphragm 36 laterally, which increases lateral vibrations of the valve element 37 in chattering. Such lateral vibrations of the valve element 37 prevents the valve element 37 from performing its smooth opening/closing operation. Further, due to the presence of the chattering problem, the conventional relief valve is poor in durability, particularly in its diaphragm 36.

SUMMARY OF THE INVENTION

Under such circumstances, the present invention was made to solve the problems inherent in the prior art. Consequently, it is an object of the present invention to provide a pressure relief valve fitted to a fluid distribution system to control fluid pressure in the system.

In accordance with the present invention, the above object of the present invention is accomplished by providing:

A pressure relief valve comprising:

a valve body (10) defining a relief fluid passage (5);

a valve element (7) adapted to open and close the relief fluid passage (5) defined in the valve body (10) and disposed between: an inlet port (2) in direct communication with an upstream-side fluid passage (1); and, an outlet port (4) in direct communication with a downstream-side fluid passage (3), wherein the valve element (7) is provided with a flange portion (8) in its upper portion; and a sleeve-like bellows (6) for supporting the valve element (7), wherein the sleeve-like bellows (6) is mounted on the flange portion (8) of the valve element (7).

In the pressure relief valve having the above construction, preferably the relief fluid passage (5) defined in the valve body (10) is provided in an upper central portion of the valve body (10) and adapted for upward relief of fluid pressure.

Further, preferably the valve element (7) assumes an inverted trapezoidal shape in cross section.

Still further, preferably: an annular member (9) is provided with a central opening and disposed on an upper surface of the valve body (10); and, an upper end portion of the sleeve-like bellows (6) is fixedly mounted on a radially-inner edge portion of a rear surface of the annular member (9), wherein the central opening of the annular member (9) is defined by the radially-inner edge portion of the rear surface of the annular member (9).

Preferably, the annular member (9) is disposed on the upper surface of the valve body (10) in a manner such that the annular member (9) extends over both the inlet port (2) and the outlet port (4).

Further, preferably a piston (12) is slidably received in the central opening of the annular member (9), resiliently biased downward by a spring (17) and capable of slidably moving up and down in the central opening of the annular member (9).

Still further, preferably the piston (12) is provided with a bellows cover (13) in its upper surface, wherein the bellows cover (13) covers a lower portion of the spring (17).

Preferably: the bellows cover (13) is housed in an outer sleeve member (11); and, the outer sleeve member (11) is fixedly mounted on the valve body (10) in a manner such that the annular member (9) is firmly sandwiched between the outer sleeve member (11) and the valve body (1).

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

Figure 1:
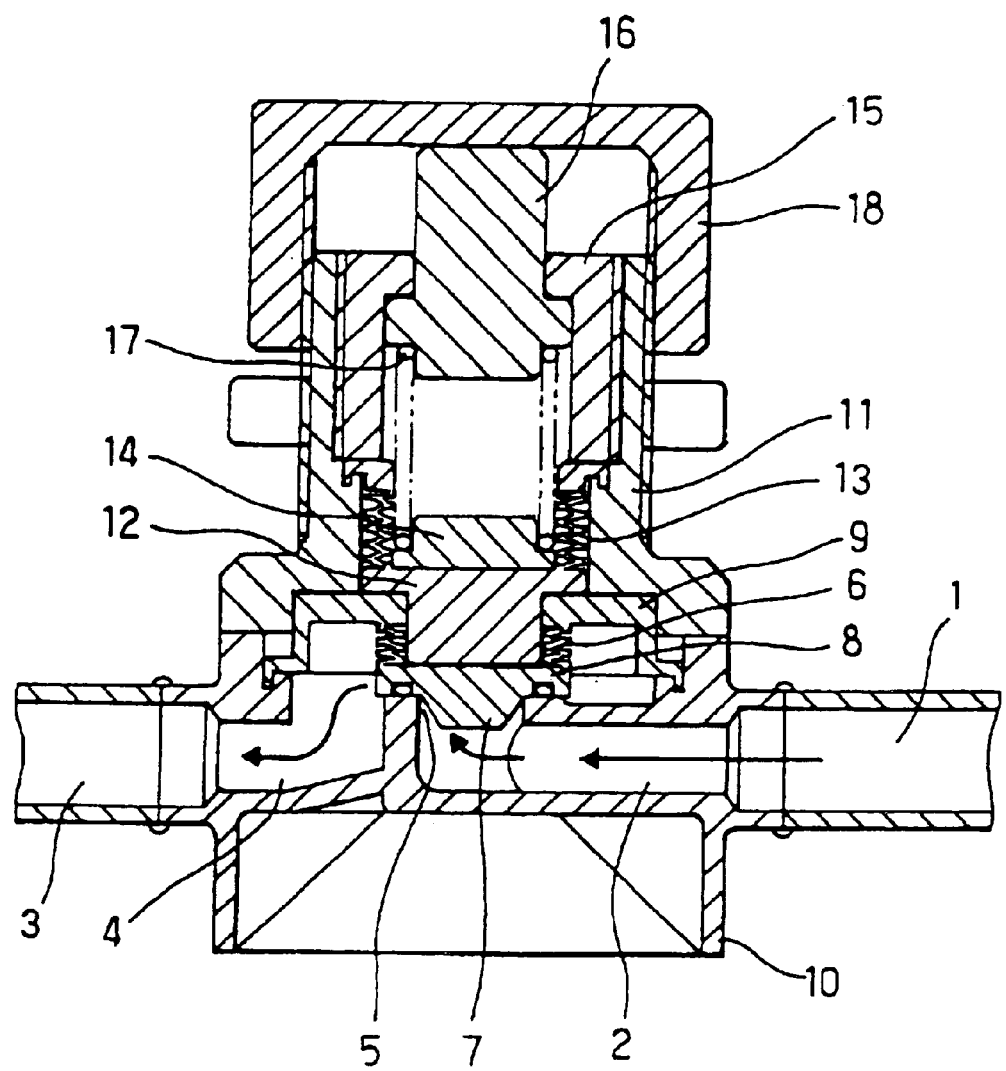
FIG. 1 is a longitudinal sectional view of the pressure relief valve of the present invention.
Figure 2:
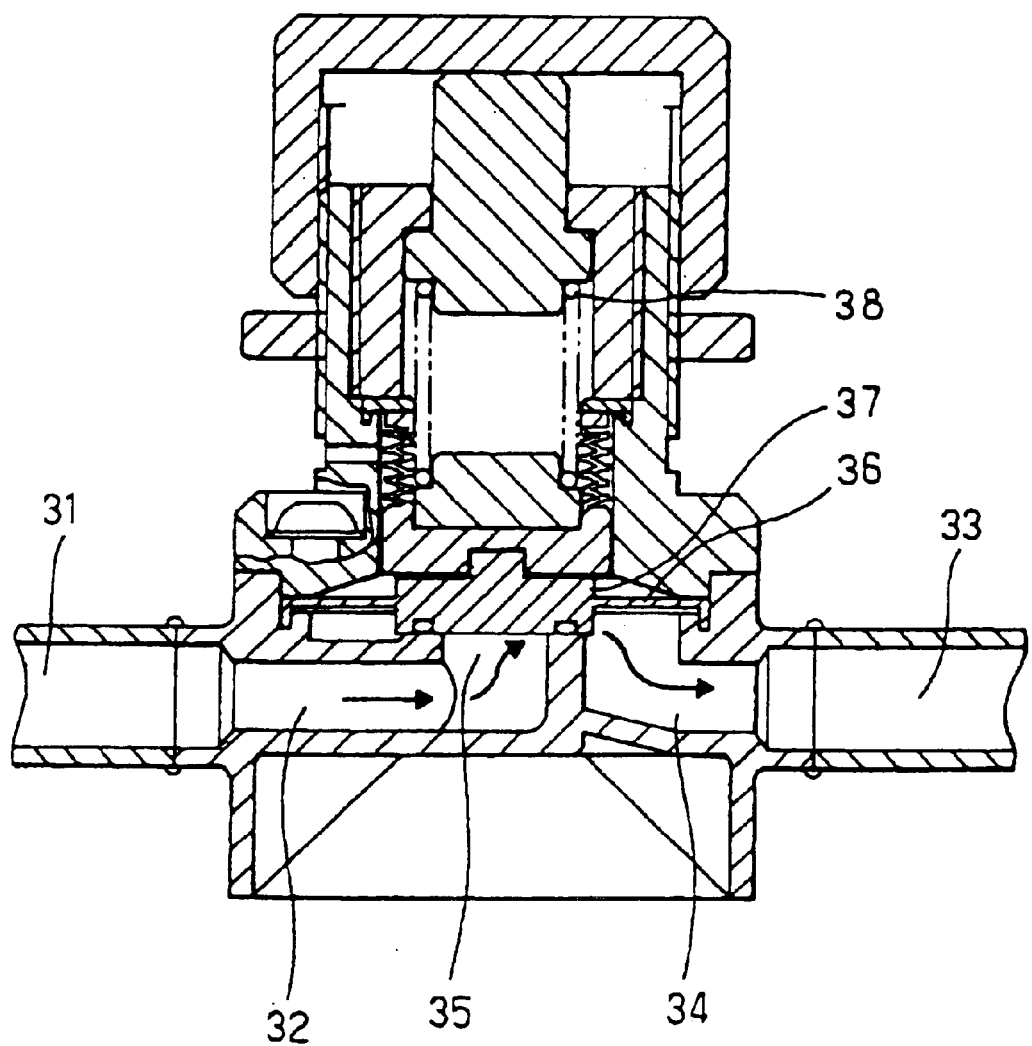
FIG. 2 is a longitudinal sectional view of the conventional pressure relief valve.

FIG. 1 shows a longitudinal sectional view of an embodiment of a pressure relief valve of the present invention.

As is clear from FIG. 1, is a pressure relief valve of the present invention includes a valve body 10, which defines a relief fluid passage 5.

Further include in the relief valve is a valve element 7, which is adapted to open and close the relief fluid passage 5. The valve element 7 is disposed between an inlet port 2 and an outlet port 4. The inlet port 2 is directed upward in the valve body 10 and is in direct communication with an upstream-side fluid passage 1. On the other hand, the outlet port 4 is directed downward in the valve body 10 and is in direct communication with a downstream-side fluid passage 3.

The valve element 7 is provided with a flange portion 8 in its upper portion.

Still further included in the relief valve is a sleeve-like bellows 6 for supporting the valve element 7. The sleeve-like bellows 6 is mounted on the flange portion 8 of the valve element 7.

In the relief valve of the present invention having the above construction, the relief fluid passage 5, which is defined in the valve body 10, is provided in an upper central portion of the valve body 10 and adapted for upward relief of fluid pressure in the valve body 10.

In the embodiment, the valve element 7 assumes an inverted trapezoidal shape in cross section.

As is clear from FIG. 1, an annular member) is provided with a central opening and disposed on an upper surface of the valve body 10. An upper end portion of the sleeve-like bellows 6 is fixedly mounted on a radially-inner edge portion of a rear surface of the annular member 9. The central opening of the annular member 9 is defined by the radially-inner edge portion of the rear surface of the annular member 9.

In construction, the annular member 9 is disposed on the upper surface of the valve body 10 in a manner such that the annular member 9 extends over both the inlet port 2 and the outlet port 4.

In the embodiment, a piston 12 is slidably mounted in the central opening of the annular member 9. The piston 12 is resiliently biased downward by a compression coil spring 17 to abut against an upper surface of the valve element 7. The piston 12 is capable of slidably moving up and down in the central opening of the annular member 9.

Further, the piston 12 is provided with a bellows cover 13 in its upper surface. The bellows cover 13 covers a lower portion of the compression coil spring 17.

The bellows cover 13 is housed in an outer sleeve member (11). This outer sleeve member 11 is fixedly mounted on the valve body 10 in a manner such that the annular member 9 is firmly sandwiched between the outer sleeve member 11 and the valve body 1.

The reference numeral 15 denotes an inner sleeve member, which is inserted into the outer sleeve member 11 from above in a manner such that the inner sleeve member 15 is threadably engaged with the outer sleeve member 11. The inner sleeve member 15 slidably receives therein an upper spring support 16 so as to permit the upper spring support 16 slidably moves up and down in the inner sleeve member 15. The upper spring support 16 is provided with a flange portion 16a. On the other hand, the compression coil spring 17 is sandwiched between this flange portion 16a of the upper spring support 16 and a lower spring support 14 in the inner sleeve member 15.

In operation, the compression coil spring 17 constantly urges the valve element 7 downward through both the lower spring support 14 and the piston 12 so as to keep the relief fluid passage 5 closed. The reference numeral 18 denotes a cap, which is threadably engaged with an upper end portion of the outer sleeve member 11 from above.

In the normal closed state of the relief valve of the present invention having the above construction, the fluid pressure in the inlet port 2 supplied from the upstream-side fluid passage 1 is applied to the valve element 7 to balance with a downward force exerted by the compression coil spring 17. When this downward force of the spring 17 overcomes the fluid pressure having received in the inlet port 2, the valve element 17 stays closed. In contrast with this, when this downward force of the compression coil spring 17 is overcome by the fluid pressure having received in the inlet port 2, the valve element 17 is pushed upward under the influence of the fluid pressure against the downward force of the compression coil spring 17 to open the relief fluid passage 5 and permit fluid passing through the relief fluid passage 5.

Since the valve element 7 is supported by the diaphragm 6, a surface of the diaphragm 6 exposed to the fluid pressure is limited to a relatively small amount corresponding to the fluid-pressure receiving surface of the valve element 7 at maximum. Due to this, the diaphragm 6 is excellent in durability in the relief valve of the present invention. Further, in the relief valve of the present invention, both the upward movement of the valve element 7 and the upward pushing operation, which is conducted by the valve element 7 and applied to the compression coil spring 17, are moderate and steady due to the presence of balance between the downward force of the compression coil spring 17 and the fluid pressure received in the inlet port 2. Consequently, the relief valve of the present invention is free from any vibration of the compression coil spring 17, which vibration has heretofore been caused in the conventional opening/closing operation performed by the conventional valve element. Further, in the relief valve of the present invention, since the sleeve-like bellows 6 may be adjusted in natural length, it is possible to sufficiently increase a stroke or traveling distance of the valve element 7 in its up-and-down movement. This permits the relief valve of the present invention to increase its fluid passage in capacity to realize a smooth delivery of a large volume fluid.

In the relief valve of the present invention, since the valve element 7 is supported by the resilient bellows 6, it is possible to moderate and smooth the up-and-down movement of the valve element 7, which considerably reduces vibrations of the valve element 7. Further, the sleeve-like bellows 6 permits the valve element 7 to sufficiently increase its traveling distance in the up-and-down movement performed in the opening/closing operation of the relief valve, which enables the relief valve of the present invention to sufficiently increase its capacity in controlling the fluid pressure.

Finally, the present application claims the Convention Priority based on Japanese Patent Application No. 2001-368517 filed on Dec. 3, 2001, which is herein incorporated by reference.

What is claimed is:

1. A pressure relief valve comprising:
a valve body (10) having a relief fluid passage (5);
a valve element (7) adapted to open and close said relief fluid passage (5), wherein said valve element (7) is disposed between an inlet port (2) in direct communication with an upstream-side fluid passage (1) and an outlet port (4) in direct communication with a downstream-side fluid passage (3), said valve element (7) having a flange portion (8) on an upper portion thereof;
wherein said upstream-side fluid passage and said downstream-side fluid passage are coaxial;

an annular member (9) engaged to said valve body (10);

a sleeve-like bellows (6) having a lower end portion fixed on said flange portion (8) of said valve element (7) and an upper end portion fixed on an edge of a central opening through said annular member; and said annular member located above an upper surface of said valve body (10) and extending over both said inlet port (2) and said outlet port (4).

2. The pressure relief valve as set forth in claim 1, wherein said relief fluid passage (5) defined in said valve body (10) is provided in an upper central portion of said valve body (10) and adapted for upward relief of fluid pressure.

3. The pressure relief valve as set forth in claim 1, wherein said valve element (7) has an inverted trapezoidal shape in cross section.

4. The pressure relief valve as set forth in claim 1, wherein a piston (12) is slidably received in said central opening of said annular member (9) and is resiliently biased downward by a spring (17) against said valve member (7) so as to slidably move up and down in said central opening with said valve member (7).

5. The pressure relief valve as set forth in claim 4, wherein said piston (12) is provided with a bellows cover (13) in its upper surface, wherein said bellows cover (13) covers a lower portion of said spring (17).

6. The pressure relief valve as set forth in claim 5, wherein:

said bellows cover (13) is housed in an outer sleeve member (11); and said outer sleeve member (11) is fixedly mounted on said valve body (10) so that said annular member (9) is firmly sandwiched between said outer sleeve member (11) and said valve body (10).

7. A pressure relief valve comprising:

a valve body (10) having a relief fluid passage (5);

a valve element (7) adapted to open and close said relief fluid passage (5), wherein said valve element (7) is disposed between an inlet port (2) in direct communication with an upstream-side fluid passage (1) and an outlet port (4) in direct communication with a downstream-side fluid passage (3), said valve element (7) having a flange portion (8) on an upper portion thereof;

an annular member (9) engaged to said valve body (10);

a sleeve-like bellows (6) having a lower end portion fixed on said flange portion (8) of said valve element (7) and an upper end portion fixed on an edge of a central opening through said annular member;

said annular member located above an upper surface of said valve body (10) and extending over both said inlet port (2) and said outlet port (4), wherein a piston (12) is slidably received in said central opening of said annular member (9) and is resiliently biased downward by a spring (17) against said valve member (7) so as to slidably move up and down in said central opening with said valve member (7); and wherein said piston (12) is provided with a bellows cover (13) in its upper surface, wherein said bellows cover (13) covers a lower portion of said spring (17).

8. The pressure relief valve as set forth in claim 7, wherein said relief fluid passage (5) defined in said valve body (10) is provided in an upper central portion of said valve body (10) and adapted for upward relief of fluid pressure.

9. The pressure relief valve as set forth in claim 7, wherein said valve element (7) has an inverted trapezoidal shape in cross section.

10. The pressure relief valve as set forth in claim 7, wherein:

said bellows cover (13) is housed in an outer sleeve member (11); and said outer sleeve member (11) is fixedly mounted on said valve body (10) so that said annular member (9) is firmly sandwiched between said outer sleeve member (11) and said valve body (10).

* * * * *